United States Patent [19]

Livers et al.

[11] 4,346,914

[45] Aug. 31, 1982

[54] ACOUSTIC EMISSION AUTOMOTIVE CRASH SENSOR

[75] Inventors: Gerald D. Livers, Santa Barbara; Frank L. Benedict, San Pedro, both of Calif.

[73] Assignee: General Motors Corporation, Detroit, Mich.

[21] Appl. No.: 217,245

[22] Filed: Dec. 17, 1980

[51] Int. Cl.$^3$ ............................................. B60R 21/08
[52] U.S. Cl. .................................. 280/735; 180/274; 310/334
[58] Field of Search ................ 280/734, 735; 180/274; 310/334, 328, 329; 73/587, 588

[56] References Cited

U.S. PATENT DOCUMENTS 3,701,903 10/1972 Merhar ................................. 280/735
3,735,398 5/1973 Ross ..................................... 280/735
4,021,057 5/1977 Held ..................................... 280/735

Primary Examiner—Joseph F. Peters, Jr.
Assistant Examiner—John A. Carroll
Attorney, Agent, or Firm—Herbert Furman

[57] ABSTRACT

An acoustic emission automotive crash sensor arrangement which includes a continuous loop type wave guide welded at a number of locations to the vehicle structures likely to be deformed upon impact of the vehicle with an object. The ends of the loop are secured to a piezoelectric crystal, the output of which is digitized and compared in a microprocessor to preprogrammed threshholds for several different parameters of the acoustic emission event to determine whether an impact of sufficient severity has occurred to require actuation of an occupant restraint. In other embodiments: the ends of the wave guide may be secured to individual crystals; the loop type wave guide may be connected to all or certain of the vehicle structures by branch wave guides; and individual wave guides may be connected between the vehicle structures and the crystal.

4 Claims, 4 Drawing Figures

ACOUSTIC EMISSION AUTOMOTIVE CRASH SENSOR

This invention relates generally to automotive crash sensors and more particularly to an acoustic emission automotive crash sensor arrangement for sensing acoustic emissions generated by deformation of vehicle structure upon vehicle impact and actuating an occupant restraint should the vehicle impact exceed a predetermined level.

BACKGROUND OF THE INVENTION

Acoustic emissions are transient elastic waves generated by the rapid release of energy within a material. During impact of an automotive vehicle with an object, acoustic emissions are generated by plastic deformation, grain boundary slip, crack initiation and crack growth occurring in the metal structure of the vehicle.

Acoustic emission sensing is presently used for the non-destructive testing of large pressure vessels and structures to determine the integrity of the material and of the welds thereof. Acoustic emission impact sensing for actuating armaments is also known.

The acoustic emission signals may be sensed by force transducers such as piezoelectric crystals having a resonant frequency sensitive to surface wave frequencies in the 100,000 kilohertz to 1.0 megahertz range. The surface wave impact on the crystal surface causes the crystal to generate an electric output signal which can be amplified, filtered and digitized. The digital data can then be compared to preprogrammed data in a microprocessor to determine whether the thresholds of certain parameters have been exceeded.

It is known to provide occupant restraints in an automotive vehicle which are actuated upon the occurrence of a predetermined level of vehicle impact. Such restraints may be of the inflatable cushion type, the belt type, or of other types and are electrically or pyrotechnically actuated when a velocity or acceleration responsive sensor indicates the existence of an impact level exceeding a predetermined level.

SUMMARY OF THE INVENTION

This invention provides an acoustic emission automotive vehicle crash sensor arrangement which picks up acoustic emission signals generated by vehicle deformation and actuates an occupant restraint should the level of one or more parameters of the emission signals exceed certain predetermined threshold levels.

In one embodiment of the invention, a continuous loop type wave guide extends around the inside perimeter of the front compartment of the vehicle and terminates at both ends at a central location on the cowl structure. The wave guide is welded at one or more locations to vehicle structure such as, the cowl structure, the hinge pillars, the rocker panels, the frame, the front fender inner support structures, the bumper support structures and the radiator support structure. Each weld provides an entry site into the wave guide for acoustic emission signals generated by deformation of the vehicle structure. The entry sites may vary in number and location with different structures and are selected to ensure that the wave guide receives acoustic emissions from those structures which are likely to be deformed in most types of automotive impacts.

The ends of the wave guide are adhesively bonded to a piezoelectric crystal having a resonant frequency sensitive to surface wave frequencies in the range of 100,000 kilohertz to 1.0 megahertz. The output signal of the crystal is conventionally amplified, filtered, and digitized. A conventional microprocessor compares the digital data to preprogrammed threshholds for several different parameters of the acoustic emission event to determine whether an impact of sufficient severity has occurred to require actuation of the occupant restraint. Those parameters of the acoustic emission signals are peak amplitude, duration, rise time, number of counts, and energy (proportional to the square of amplitude). The microprocessor can require that the threshhold values of all or only certain parameters be exceeded before the occupant restraint is actuated.

Alternatively, each end of the wave guide may be adhesively bonded to a respective crystal, each of which is capable of actuating the restraint. The use of two crystals permits monitoring of the wave guide. One of the crystals can be set into resonance each time that the vehicle ignition is turned on. The wave generated by the one crystal will pass along the wave guide and be sensed by the other crystal if there is no interruption in the wave guide. The time required for the wave to travel from the one crystal to the other crystal through the wave guide can be checked by a conventional monitor microprocessor arrangement. If the time required exceeds a predetermined level, or if no signal is received by the other crystal, then a diagnostic lamp or other indicator can be actuated to indicate an anomaly in the wave guide.

In another embodiment of the invention, a loop type main wave guide is connected to all or certain of the entry sites by branch wave guides welded therebetween. The branch wave guides permit remote or relatively inaccessible locations to be connected to the main wave guide.

In both of these embodiments of the invention, there will be some attenuation of the acoustic emission signals since they travel through the wave guide in opposite directions from the initial entry site to each end thereof. There will also be some attenuation of the signals due to the signals partially travelling out of the wave guide at entry sites intermediate the initial entry site and the ends of the wave guide.

Such attenuation of the acoustic emission signals can be obviated by a third embodiment of the invention wherein individual wave guides are dedicated to specific structures and are directly connected between an entry site on such structure and the crystal. In this embodiment, once the acoustic emission signals enter the wave guide at the entry site, they travel directly to the crystal and do not pass any other entry site.

In each embodiment of the invention, the connection between the wave guide and the structure must be of such integrity as to ensure that acoustic emission signals originating in such structure are passed to the wave guide. Directly welding the wave guide to the structure is one known satisfactory method of connection. The wave guides are comprised of conventional low carbon steel rod of $\frac{1}{8}$ inch to 3/16 inch diameter. However, other sizes would be acceptable. The acoustic emission signals travel along the surface of the wave guides as surface waves, known as Rayleigh or Lamb waves, at a speed of approximately 17,000 ft/sec. Such waves impact the surface of the piezoelectric crystal and stress the crystal to produce a minimal voltage which provides the generated output signal. The crystal must be directly connected to the end of the wave guide, such as by adhesive bonding, in order to receive the full impact of the surface wave moving along the wave guide.

The crash sensor arrangement of this invention is of course applicable to other structures of the vehicle such as the rear compartment. It has been described in conjunction with the structures of the front compartment of the vehicle since the front compartment is the highest potential impact area of the vehicle and contains substantially all of the high potential impact locations. Where a looped type wave guide is not used, the individual wave guides may each have respective sensors or groups of wave guides may be connected to one sensor. Likewise, such sensors can all be connected to the same microprocessor or more than one microprocessor may be used.

Each embodiment provides several distinct advantages over known crash sensor arrangements for actuating an occupant restraint. The wave guides can be welded into the vehicle at an early stage in the manufacture thereof. The body can thereafter continue along the normal manufacturing process and can be subjected to: immersion in corrosion prevention material; paint preparation and application; baking; and various test procedures without fear of damage to the wave guide or its function. The vehicle components which are located in the front compartment, such as the engine, transmission, suspension, radiator, etc., can also be assembled without fear of damage to the wave guide. Any surface imperfections in the wave guide, such as dents or bends, due to assembly operations, will have a negligible effect on the rate of travel of the acoustic emission signals along the wave guide, provided that the welds at the entry sites are not damaged. Once the body is assembled, the crystal, microprocessor, and occupant restraint can then be easily installed in the vehicle.

It is therefore a primary object of this invention to provide an acoustic emission vehicle crash sensor arrangement for actuating on occupant restraint in accordance with the level of severity of impact of the vehicle with an object. Another object of this invention is to provide such an arrangement which includes a wave guide operatively connected to one or more high potential impact locations on various vehicle structures for transmitting acoustic emission signals between such structures and an acoustic emission sensor actuating an occupant restraint should the signals indicate that a vehicle impact at such location exceeds a predetermined level. A further object of this invention is to provide such an arrangement wherein the wave guide is a continuous loop type wave guide extending around the interior of a compartment of the vehicle and welded to the compartment structure at the high potential impact locations. Yet another object of this invention is to provide such an arrangement wherein the continuous loop type main wave guide is connected to the locations by branch wave guides welded to both the main wave guide and each location. Yet a further object is to provide such an arrangement wherein individual dedicated wave guides extend between each location and the sensor.

These and other objects of the invention will be readily apparent from the following specification and drawings wherein.

Figure 1:
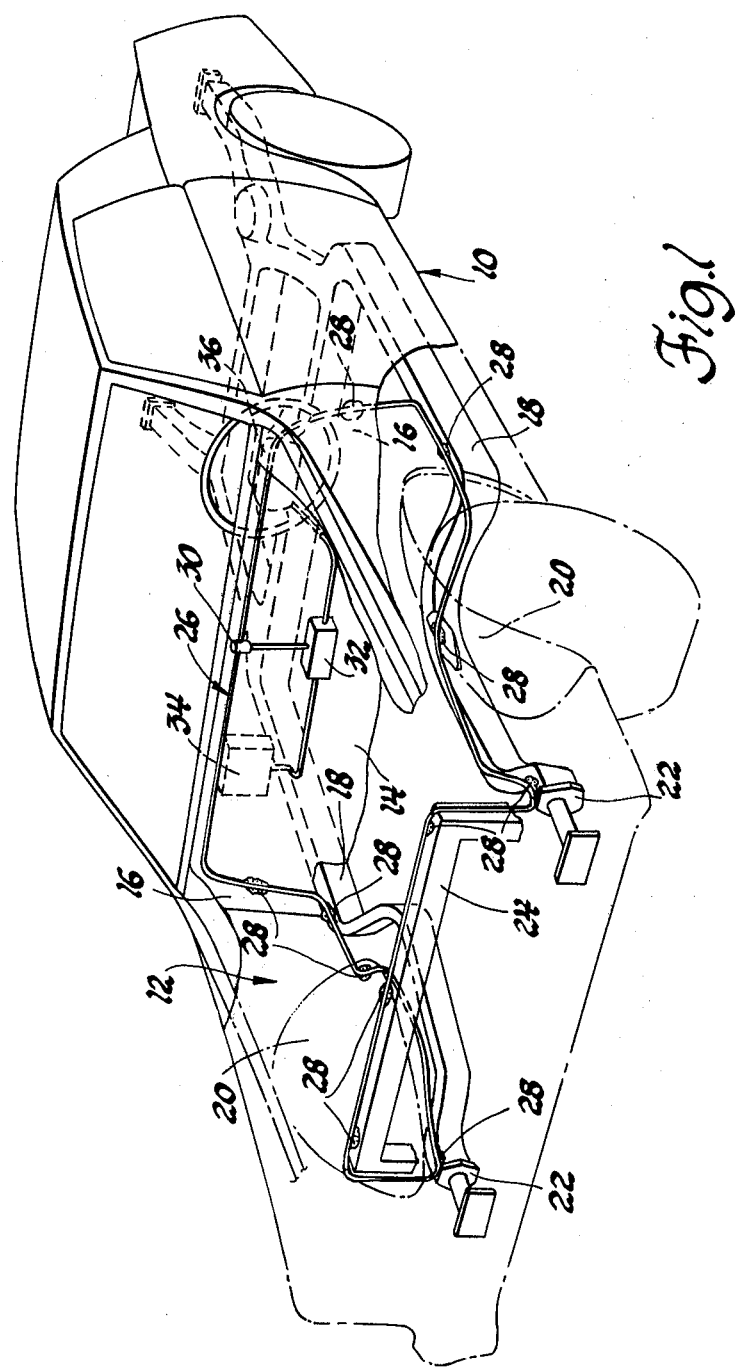
FIG. 1 is a perspective schematic view of a vehicle body having a crash sensor arrangement according to one embodiment of the invention.
Figure 4:
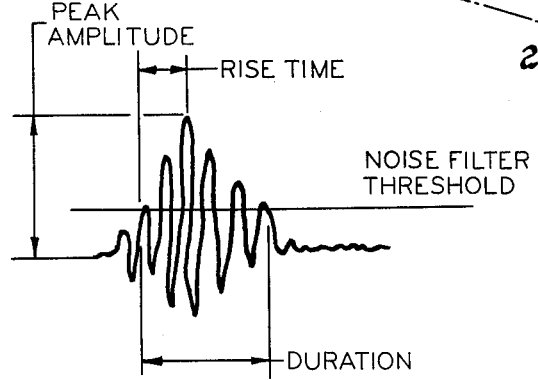
FIG. 4 identifies the parameters characterizing an acoustic emission event.

Referring now to FIG. 1 of the drawings, a schematically indicated vehicle 10 of the body-frame type includes a front compartment 12 which includes cowl structure 14, body hinge pillar structures 16, frame rail structure 18, front wheel inner housing structures 20, bumper support structures 22, and a radiator support structure 24. These structures are conventional and are found in current production vehicles of this type. The structures are welded or bolted together to form a substantially rigid interconnected front compartment housing the engine, at least part of the transmission, and other components. The details of the structures are not shown since they form no part of this invention. In accordance with one embodiment of the invention, a loop type wave guide 26 extends continuously generally around the inside perimeter of the front compartment 12. The wave guide is comprised of one eighth inch to three sixteenth inch diameter low carbon steel rod and is shaped so as to generally follow along the cowl structure 14, the hinge pillar structures 16, the rail structures 18, the housing structures 20, the bumper support structures 22 and the radiator support structure 24. At locations designated 28, the wave guide 26 is welded to each of these structures. Any conventional welding, such as arc or tig, may be used to weld the wave guide to the various structures. All that is required is that a permanent trouble free intimate bond be provided between the wave guide and each of the vehicle structures forming the front compartment. The ends of the wave guide are adhesively bonded to a piezoelectric crystal 30 located generally at the vehicle center line adjacent the upper edge of the cowl structure 14. The crystal is conventional and has a resonant frequency sensitive to surface wave frequencies in the range of 100,000 kilohertz to 1.0 megahertz. The crystal is electrically connected to a conventional microprocessor 32 which filters, amplifies and digitizes the electrical output signal of the crystal shown in FIG. 4 and compares the digitized data with preprogrammed threshholds for several different parameters of the acoustic emission event. Those parameters of acoustic emission signals are peak amplitude, duration, rise time, number of counts, and energy (proportional to the square of amplitude). The microprocessor is electrically connected to a conventional electrically actuated inflatable passenger restraint system 34 and a conventional electrically actuated driver restraint system 36, both of which are located within the passenger compartment. Such systems have been used in production and reference may be had to U.S. Pat. Nos. 3,788,665 Noll et al. and 3,819,205 Dunford et al. for further details.

The front compartment 12 of the vehicle 10 represents the highest potential impact area of the vehicle and the various structures which make up the front compartment represent substantially all of the high potential impact locations.

Should the vehicle 10 impact an object, the deformation of any one or more of the structures of the front compartment generate acoustic emission signals by plastic deformation, grain boundary slip, crack initiation, and crack growth of the metal components of these structures. These acoustic emission signals enter the wave guide at one or more of the welds 28 and pass from the initial entry site or sites in both directions along the wave guide as surface waves to the crystal 30. The impact of the surface waves on the crystal 30 causes this crystal to generate an electrical output signal which is then processed in the microprocessor 32. Depending on the programming in the microprocessor, if any one or more of the parameters of the analog output of the crystal exceed certain threshhold levels, the microprocessor will actuate the occupant restraint systems 34 and 36.

While there will be some attenuation of the acoustic emission signals due to such signals partially passing out of the wave guide at welds 28 intermediate the initial entry site or sites and the crystal 30, such attenuation can be compensated for by the setting of the threshhold values in the microprocessor 32.

If desired, each end of the wave guide may be adhesively bonded to a respective separate crystal 30. Both would be electrically connected in parallel to the microprocessor 32 so that each is capable of actuating the occupant restraint systems 34 and 36. If a monitor system is desired, one of the crystals can be set into resonance each time that the ignition is turned on and the other crystal can be connected to a monitor microprocessor to check the time required for the surface wave to travel through the wave guide from the resonating crystal to the sensing crystal. If the time required is excessive or if no wave impacts the sensing crystal, a suitable indicator, such as a warning light or buzzer within the passenger compartment, can be actuated to indicate to the driver the existence of an anomaly in the wave guide.

Figure 2:
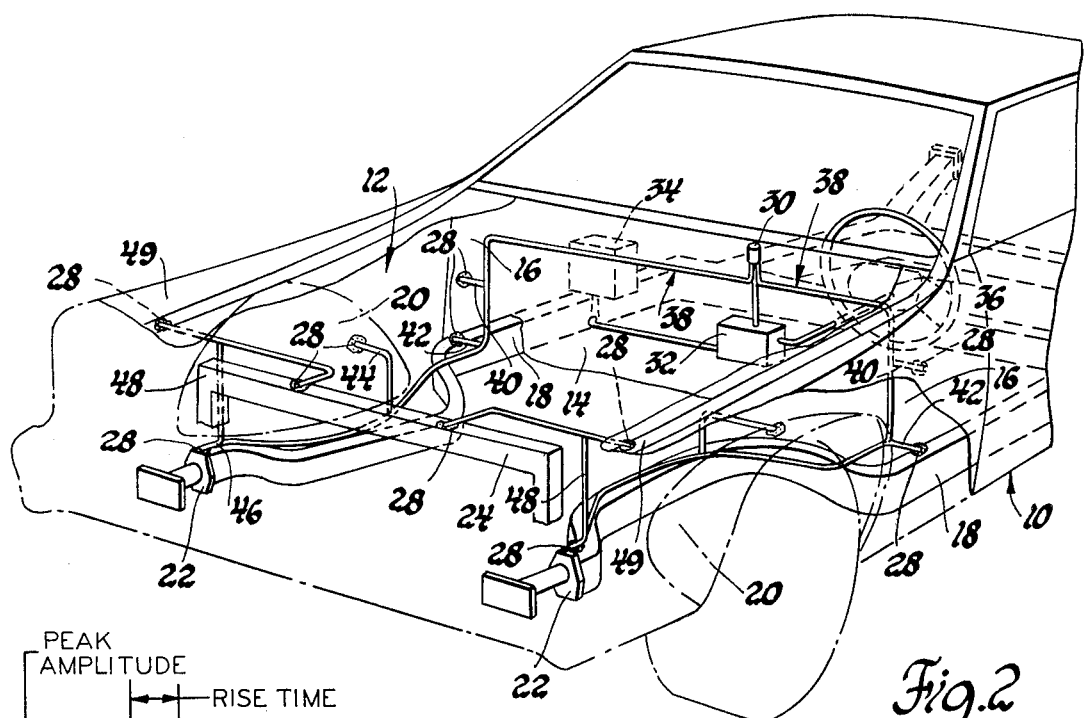
FIG. 2 is a perspective schematic view of a vehicle body having a crash sensor arrangement according to another embodiment of the invention.

FIG. 2 shows another embodiment of the invention wherein like numerals are used for like parts. A pair of right hand and left hand main wave guides 38 each extend along a respective side of the interior of the front compartment 12. Each wave guide 38 is adhesively bonded at one end to the crystal 30 and includes branches welded between the wave guide and the structures of the front compartment 12. Thus, each wave guide includes a branch 40 welded at 28 to a hinge pillar 16; a branch 42 welded at 28 to a frame rail structure 18; a branch 44 welded at 28 to a housing structure 20; a branch 46 welded at 28 to a bumper support structure 22; and a branch 48 welded at two places 28 to the radiator support structure 24 and to the front fender structure 49. The crystal 30 is electrically connected to the microprocessor 32 which actuates the restraint systems 34 and 36 in the same manner as in the first embodiment.

This embodiment differs from the first embodiment in that branch wave guides extend from a main wave guide to the various structures on each side of the front compartment, with the branch wave guides being welded between such structures and the main wave guide. The acoustic signal entering the main wave guide has less attenuation of the signal since it passes fewer entry sites intermediate the initial entry site and the crystal 30.

This embodiment is useful in connecting remote or relatively inaccessible locations of the front compartment to a main wave guide, particularly in instances where the structure of the front compartment is such as to make it impossible to locate the main wave guide adjacent to such structure so as to be welded thereto. It will be understood, of course, that not all of the structures need be connected to the main wave guide by branch wave guides. A main wave guide can be directly welded to accessible structures and branch guides used for relatively inaccessible structures or locations thereon. Alternatively, a loop type guide as in the first embodiment can be directly welded to accessible structures and branch guides used for inaccessible structures or locations thereon.

Figure 3:
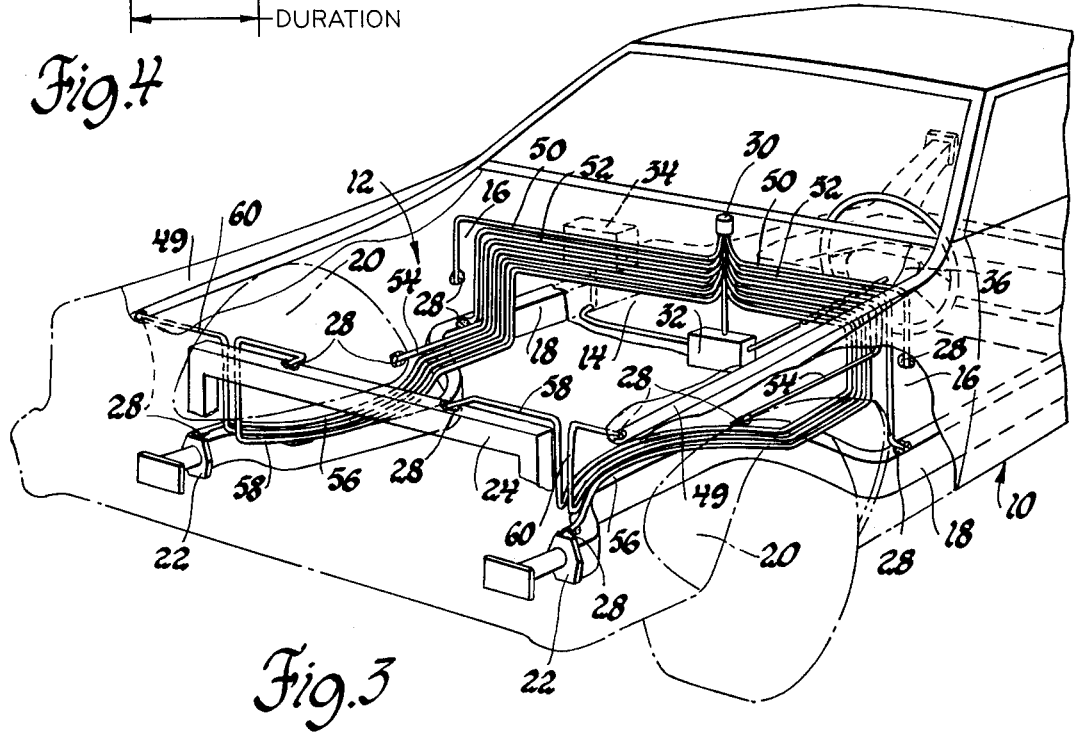
FIG. 3 is a perspective schematic view of a portion of a vehicle body having a crash sensor arrangement according to a further embodiment of the invention.

FIG. 3 shows a further embodiment of the invention wherein like numerals are used for like parts. In this embodiment of the invention, a plurality of individual wave guides are dedicated to specific structures of the front compartment. Such wave guides are adhesively bonded at one end to the crystal 30 and welded at their other ends to one of the structures of the front compartment. Thus, wave guides 50 interconnect the crystal 30 and each of the hinge pillar structures 16; wave guides 52 interconnect the crystal 30 and each of the frame rail structures 18; wave guides 54 interconnect the crystal 30 and each of the housing structures 20; wave guides 56 interconnect the crystal 30 and each of the bumper support structures 22; wave guides 58 interconnect crystal 30 and the radiator support structure 24; and wave guides 60 interconnect the crystal 30 and the fender structures 49. If desired, more than one crystal servicing certain specific wave guides may be provided. Each crystal will be operatively connected to the microprocessor 32. This embodiment obviates attenuation of the acoustic emission signal due to such signal travelling in both directions to the crystal 30 from an initial entry site into the wave guide, as in the first embodiment, and also due to the acoustic emission signal partially travelling out of the wave guide at entry sites intermediate the initial entry site and the crystal 30, as in the first and second embodiments.

If more than one crystal is provided, the threshhold levels of the crystals need not be the same but may be set at different levels depending on the structure to which the crystal is connected by a dedicated wave guide.

Although the invention has been shown and described in conjunction with the front compartment of a vehicle of a body-frame type, it will be understood that other compartments, such as the rear compartment of vehicles of this type, may likewise be covered by a crash sensor arrangement according to this invention. Additionally, certain body structures intermediate the front and rear compartments, such as the door pillars, door structures, or door support structures, may be likewise covered. The crash sensor arrangement of this invention may likewise be used with integral body type vehicles which generally have front compartments, rear compartments and body structures intermediate such compartments.

Where more than one crystal 30 is provided, the microprocessors servicing such crystals may be set at different threshhold levels.

Thus this invention provides an acoustic emission automotive crash sensor arrangement for sensing acoustic emissions generated by deformation of vehicle structure upon vehicle impact with an object and actuating an occupant restraint should the impact exceed a predetermined level.

The embodiments of the invention in which an exclusive property or privilege is claimed are defined as follows:

1. In combination with a vehicle having structure emitting an acoustic signal upon deformation thereof due to vehicle impact with an object and an occupant restraint, an acoustic emission sensor arrangement comprising, in combination, elongate wave guide means generating a wave in response to an acoustic signal, means connecting the wave guide means to a discrete location on the vehicle structure to provide an entry site into the wave guide means for acoustic signals originating in the vehicle structure upon deformation thereof, a sensor generating an electrical output signal in response to a predetermined force impressed thereon, means mounting the sensor on the vehicle at a location remote from the entry site, means connecting the wave guide means to the sensor to generate an electrical output signal in response to acoustic signals emitted from the vehicle structure, and means responsive to the sensor output signal for actuating the occupant restraint when the sensor output signal indicates that a predetermined level of vehicle impact has occurred.

2. In combination with a vehicle having structure emitting an acoustic signal upon deformation thereof due to vehicle impact with an object and an occupant restraint, an acoustic emission sensor arrangement comprising, in combination, an elongate wave guide loop generating a wave in response to an acoustic signal, means connecting the wave guide intermediate the ends thereof to a number of discrete locations on the vehicle structure to provide a number of entry sites into the wave guide for acoustic signals originating in the vehicle structure upon deformation thereof, a sensor generating an electrical output signal in response to a predetermined force impressed thereon, means mounting the sensor on the vehicle at a location remote from the entry site, means connecting the ends of the wave guide to the sensor to generate an electrical output signal in response to acoustic signals emitted from the vehicle structure, and means responsive to the sensor output signal for actuating the occupant restraint when the sensor output signal indicates that a predetermined level of vehicle impact has occurred.

3. In combination with a vehicle having structure emitting an acoustic signal upon deformation thereof due to vehicle impact with an object and an occupant restraint, an acoustic emission sensor arrangement comprising, in combination, an elongate main wave guide loop generating a wave in response to an acoustic signal, branch wave guides connecting the main wave guide to discrete locations on the vehicle structure to provide entry sites in the main wave guide for acoustic signals originating at the discrete locations upon deformation of the vehicle structure, a sensor generating an electrical output signal in response to a predetermined force impressed thereon, means mounting the sensor on the vehicle at a location remote from the entry site, means connecting the ends of the main wave guide to the sensor to generate an electrical output signal in response to acoustic signals emitted from the vehicle structure, and means responsive to the sensor output signal for actuating the occupant restraint when the sensor output signal indicates that a predetermined level of vehicle impact has occurred.

4. In combination with a vehicle having structure emitting an acoustic signal upon deformation thereof due to vehicle impact with an object and an occupant restraint, an acoustic emission sensor arrangement comprising, in combination, a plurality of elongate wave guides, each generating a wave in response to an acoustic signal, means connecting one end of each wave guide to a discrete location on the vehicle structure to provide an entry site into the wave guide for acoustic signals originating in the vehicle structure upon deformation thereof, a sensor generating an electrical output signal in response to a predetermined force impressed thereon, means mounting the sensor on the vehicle at a location remote from the entry site, means connecting the wave guides to the sensor to generate an electrical output signal in response to acoustic signals emitted from the vehicle structure, and means responsive to the sensor output signal for actuating the occupant restraint when the sensor output signal indicates that a predetermined level of vehicle impact has occurred.

* * * * *

UNITED STATES PATENT AND TRADEMARK OFFICE
CERTIFICATE OF CORRECTION

PATENT NO. : 4,346,914

DATED : August 31, 1982

INVENTOR(S) : Gerald D. Livers; Frank L. Benedict

It is certified that error appears in the above-identified patent and that said Letters Patent is hereby corrected as shown below:

On the title page, assignee should read

-- (73) Assignees: General Motors Corporation, Detroit, Michigan, and Endevco Corporation, San Juan Capistrano, California --.

Signed and Sealed this

Nineteenth Day of July 1983

[SEAL]

Attest:

GERALD J. MOSSINGHOFF

Attesting Officer

Commissioner of Patents and Trademarks